United States Patent
Bon et al.

(10) Patent No.: US 9,286,667 B2
(45) Date of Patent: Mar. 15, 2016

(54) METHOD OF ELIMINATING SPURIOUS ECHOES IN SAR IMAGING

(71) Applicant: THALES, Neuilly sur Seine (FR)

(72) Inventors: Nicolas Bon, Elancourt (FR); Jean-Michel Quellec, Elancourt (FR); Gabriel Marchalot, Elancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/260,881

(22) Filed: Apr. 24, 2014

(65) Prior Publication Data

US 2014/0321693 A1 Oct. 30, 2014

(30) Foreign Application Priority Data

Apr. 26, 2013 (FR) ...................................... 13 00977

(51) Int. Cl.
| | |
|---|---|
| *G06K 9/00* | (2006.01) |
| *G06T 5/50* | (2006.01) |
| *G01S 7/292* | (2006.01) |
| *G01S 13/90* | (2006.01) |
| *G01S 13/89* | (2006.01) |

(52) U.S. Cl.
CPC . *G06T 5/50* (2013.01); *G01S 7/292* (2013.01); *G01S 7/2925* (2013.01); *G01S 13/89* (2013.01); *G01S 13/90* (2013.01)

(58) Field of Classification Search
CPC . G01S 13/9011; G01S 13/9035; G01S 13/90; G01S 13/89; G01S 13/9005; G01S 2007/2883; G06T 5/50
USPC .......... 382/100; 342/118, 179, 178, 107, 108, 342/195, 196
See application file for complete search history.

(56) References Cited

U.S. PATENT DOCUMENTS

| | | | | |
|---|---|---|---|---|
| 4,355,311 A * | 10/1982 | Frosch | ................ | G01S 13/9005 342/196 |
| 5,430,445 A * | 7/1995 | Peregrim | ................ | F41G 7/343 342/25 C |
| 5,539,408 A * | 7/1996 | Moreira | ................... | G01S 13/58 342/107 |
| 6,310,575 B1 * | 10/2001 | Chabah | ................. | G01S 7/2927 342/159 |
| 6,781,541 B1 * | 8/2004 | Cho | .................... | G01S 13/9035 342/195 |
| 6,919,839 B1 * | 7/2005 | Beadle | .................... | G01S 7/025 342/118 |
| 7,532,150 B1 * | 5/2009 | Abatzoglou | ........ | G01S 13/9035 342/25 A |
| 7,609,318 B2 * | 10/2009 | Zador | ................... | G06T 1/0007 348/351 |
| 2010/0013906 A1* | 1/2010 | Border | ................. | H04N 5/2259 348/36 |
| 2012/0250748 A1* | 10/2012 | Nguyen | ................. | G01S 13/90 375/224 |
| 2012/0257071 A1* | 10/2012 | Prentice | .............. | H04N 5/2625 348/220.1 |

OTHER PUBLICATIONS

Jochen Horstmann, et al., "Global Wind Speed Retrieval from SAR", IEEE Transactions on Geoscience and Remote Sensing, Oct. 1, 2003, pp. 2277-2286, vol. 41, No. 10, IEEE Service Center,Piscataway, NJ, USA, XP011102420.
P. Ferrazzoli, et al., "Rain-Induced Modification of SAR Performance", Advances in Space Research, Jan. 1, 1987, pp. 269-272, vol. 7, No. 11, XP055099922.

* cited by examiner

*Primary Examiner* — Stephen R Koziol
*Assistant Examiner* — Shaghayegh Azima
(74) *Attorney, Agent, or Firm* — Baker Hostetler LLP (57) ABSTRACT

A method of eliminating spurious echoes in SAR imaging comprises a step Etp1 of defining the SAR imaging parameters, a step Etp2 of calculating the spectrum of the signal received, in each distance bin, of a zone of interest 51, a step Etp3 of filtering the spectra in each distance bin, a step Etp4 of SAR imagette 51 formation and a step Etp5 of concatenating the SAR imagettes 51 to form the final SAR image.

2 Claims, 5 Drawing Sheets

▨ Ground zone imaged during the illumination when the aircraft is around the position A1

▨ Ground zone imaged during the illumination when the aircraft is around the position A7

METHOD OF ELIMINATING SPURIOUS ECHOES IN SAR IMAGING

CROSS-REFERENCE TO RELATED APPLICATION

This application claims priority to foreign French patent application No. FR 1300977, filed on Apr. 26, 2013, the disclosure of which is incorporated by reference in its entirety.

FIELD OF THE INVENTION

The present invention relates to the general field of synthetic aperture airborne or space radars. The present invention relates more particularly to a method of eliminating spurious echoes in SAR images.

BACKGROUND

Synthetic aperture radars (SARs) are widely used in the activities of remote analysis of the physical characteristics of terrestrial and maritime zones on the basis of their radar reflectivity. These activities are called "Radar remote sensing". One of the activities in this field is the detection of hydrocarbon oil slicks on the sea by difference of radar reflectivity level between the polluted zones and the unpolluted zones.

Studies have been carried out to evaluate the disturbance introduced by the presence of rain in respect of this analysis. Such is the case for example for the study "Rain-induced modification of SAR performance" by P. Ferrazzoli and G. Schiavon—Adv Space Res vol 7 No. 11 1987. In this study, the defects related to the presence of rain are presented but the analysis performed does not deal with the fact that the rain echoes may have a Doppler spectrum that is shifted with respect to the spectrum of the ground echoes of the observed zone. Moreover, this study does not propose any solution for reducing the disturbance.

Other studies deal with the impact of the presence of moving echoes in the zone observed by an SAR radar (see notably "Principles and applications of imaging radars"—Manual of Remote Sensing—Third Edition—Volume 2) and propose solutions to enable detection of moving echoes on the basis of SAR processing. However, these techniques, which are akin to the techniques for detecting moving targets (or MTI for Moving Target Indicator), are effective only for the detection of targets having a radial velocity sufficient for their Doppler frequency to exit the Doppler spectrum of the fixed echoes observed by the SAR technique. These techniques are not applicable in the case where the domain of variation of the relative radial velocities of the disturbing elements such as rain drops is not clear of the domain of the relative radial velocities of the elements of the observed scene which are at the same geographical position.

Techniques for improving the texture of images of maritime, rural or forest SAR scenes have also been described notably in the work "Principles and applications of imaging radars" cited previously. These procedures are applied to already constructed SAR images. They rely on the construction of the 2D spectrum of the SAR image and on the elimination of a part of the spectrum which corresponds to speckle, so as to retain only the elements having a particular texture like the pattern of waves. These procedures are applicable only when the expected image has a particular texture. Such is not the case, for example, when observing a clear calm sea, at low grazing angle under horizontal polarization.

Finally, in situations where the phenomenon of interest does not lead to images having a particular texture, segmentation procedures can be used. These procedures are based on the identification of probability density laws which differ on the background of the image and on the zone sought.

This segmentation can also be complemented with so-called "mathematical morphology" operations making it possible to smooth the image resulting from the segmentation, starting from the assumption that the zones sought have an extent of several pixels of the image.

A drawback of these solutions is that they are applied once the SAR image has been created and the spurious phenomenon has contributed to the increasing of all the levels of the pixels corresponding to zones of low reflectivity that it is sought to identify on the map and therefore to reducing the contrast between the zones of low reflectivity and the zones of lower reflectivity.

An aim of the invention is notably to correct all or some of the aforementioned drawbacks by proposing an SAR imaging processing method making it possible to attenuate the effects of spurious echoes.

SUMMARY OF THE INVENTION

For this purpose, the subject of the invention is a method of eliminating spurious echoes in SAR imaging comprising:
  a step of defining the SAR imaging parameters,
  a step of calculating the spectrum of the signal received, in each distance bin, of a zone of interest,
  a step of filtering the spectra in each distance bin carried out by a bandpass filter centred on the central frequency $f_{D0}$ of the fixed echoes backscattered by the zone of interest, the said central frequency $f_{D0}$ being obtained by correlation of the measured spectrum with the theoretical shape of the spectrum obtained on the basis of the characteristics of the radar antenna diagram,
  a step of SAR imagette formation and
  a step of concatenating the SAR imagettes to form the final SAR image.

According to one mode of implementation, in the case of overlap of pixels during the concatenation step, the latter comprises a step of averaging the value of the pixels of each point of the final SAR image that is overlapped by several imagettes.

In an advantageous manner, the present invention makes it possible to improve the contrast in the SAR images by reducing the level of the spurious glitches due to natural radar echoes, for example related to rain particles or breaking waves, which have a velocity spectrum that is in general wider than that of the phenomena or objects observed which are static or hardly moving.

BRIEF DESCRIPTION OF THE DRAWINGS

Other particular features and advantages of the present invention will become more clearly apparent on reading the description hereinafter, given by way of nonlimiting illustration and with reference to the appended drawings, in which.

DETAILED DESCRIPTION

The method according to the invention can be implemented, for example, by moving carriers of aircraft or satellite type that have onboard a device of synthetic aperture radar (or SAR) type for monitoring a zone of interest.

Figure 1:
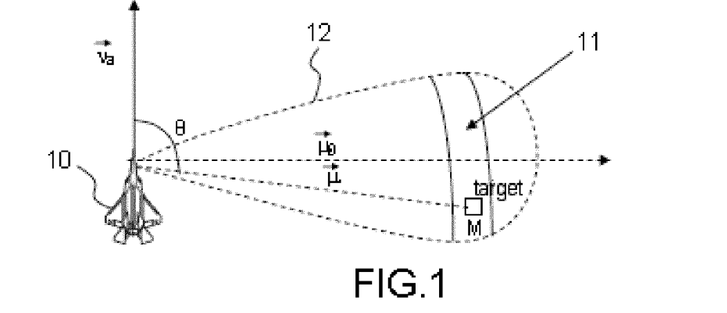
FIG. 1 represents an exemplary platform performing an imaging of SAR type of a target.

High-resolution radar mapping from airborne or space platforms 10 is generally carried out by the SAR imaging technique. With reference to FIG. 1, the principle of SAR mapping is recalled briefly. It is suitable for mapping fixed points. SAR radar imaging uses the Doppler frequency of the targets to separate them angularly.

If one considers a moving target M illuminated by the antenna lobe of a synthetic aperture radar, this target has a Doppler frequency $f_D$ which depends on its angle $\theta$ with respect to the velocity vector $\vec{v}_a$ of the platform 10 such that:

$$f_D = \frac{2\vec{v}_a \cdot \vec{u}(\theta)}{\lambda} \quad \text{(Equation 1)}$$

For a platform 10 having a horizontal velocity vector $V_a$ and a grazing sight line, the previous equation can be simplified to become:

$$f_D = \frac{2 \cdot va}{\lambda} \cdot \cos\theta. \quad \text{(Equation 1 bis)}$$

or $$f_D = \frac{2 \cdot va}{\lambda} \cdot \sin\alpha \cdot \text{ (with } \alpha = \pi/2 - \theta) \quad \text{(Equation 1 ter)}$$

Where: $\lambda$ represents the wavelength of the radar and $\vec{u}$ the unit vector directed towards the target M.

Thus, the zone illuminated by the antenna lobe, $\Delta f_{D,lobe}$, has a Doppler extent which is directly linked to the −3 dB aperture of the antenna lobe $\Delta\theta 3db$:

$$\Delta f_{D,lobe} = \frac{2\vec{v}_a \cdot \vec{u}'(\theta)}{\lambda} \Delta\theta 3db$$

or more simply:

$$\Delta f_{D,lobe} = \frac{2v_a}{\lambda} \sin\theta \Delta\theta 3db \quad \text{(Equation 2)}$$

The useful spectrum in respect of the formation of the SAR image is thus included in the useful band $\Delta f_{D,lobe}$. Its central frequency corresponds to the Doppler frequency at the centre of the antenna lobe:

$$f_{D_0} = \frac{2\vec{v}_a \cdot \vec{u}_0(\theta)}{\lambda} \quad \text{(Equation 3)}$$

It should be noted that, in practice, the Doppler frequency $f_{D0}$ is not known with high precision because of the various errors in the value and the direction of the vector $V_a$, and in the direction of the antenna, on account notably of harmonization errors.

The Doppler resolution $\delta fd$ can be obtained by differentiating equation 1.

$$\delta fd = 1/Ti \quad \text{(Equation 4)}$$

$$= \frac{2 \cdot va}{\lambda} \cdot \sin\theta \cdot \delta\theta$$

Where Ti represents the coherent-integration time

The transverse resolution $\delta rt$ can be given by the formula:

$$\delta rt = D \cdot \delta\theta \quad \text{(Equations 5)}$$

$$= \frac{\lambda \cdot D}{2 \cdot va \cdot \sin\theta \cdot Ti}$$

Where D represents the distance of the zone to be imaged

In the case where the target M is moving, such as for example in the case of raindrops moving under the effect of the wind or that of white horses on the surface of the sea, equation (1 bis) becomes:

$$f_D = \frac{2 \cdot va}{\lambda} \cdot \cos\theta + \frac{2 \cdot Vr}{\lambda} \quad \text{(Equation 6)}$$

Where Vr represents the radial velocity of the object.

Figure 2:
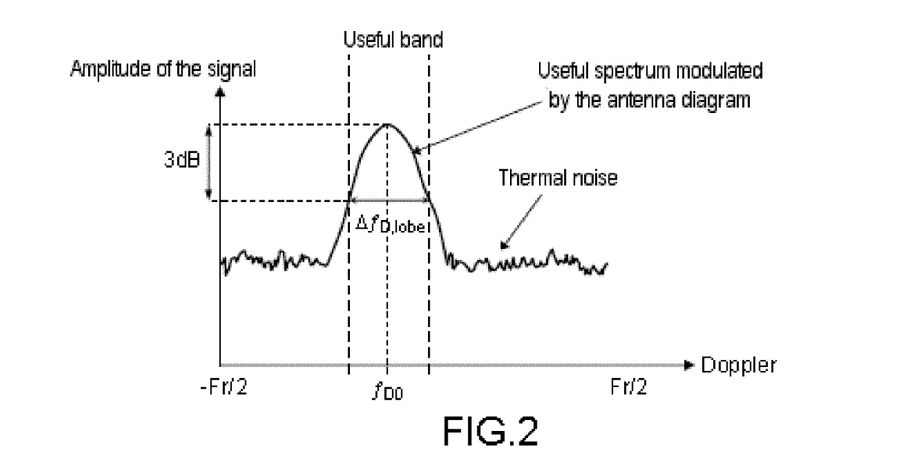
FIG. 2 is an exemplary graphical representation of the amplitude of a signal spectrum received by a radar of SAR type.

FIG. 2 gives an exemplary spectral representation of the trend of the amplitude of the signal received by a synthetic aperture radar, of the various fixed points located in its resolution cell. This representation corresponds to a simplified case where the radar backscattering coefficient is constant.

We have seen previously that for a target-platform axis substantially perpendicular to the trajectory of the platform 10, thus corresponding to a value of the angle $\alpha$ close to zero, a relation existed between the Doppler frequency and the angle $\alpha$ (cf. Equation 1ter). In the case of a uniform backscattering coefficient, the trend of the centre of the spectrum of the signal received from the resolution cell corresponds to the shape of the main lobe of the antenna squared since the signals received from the radar resolution cell are stronger or weaker according to their skew in the lobe.

In order to form the SAR image, after the calculation of the spectrum of the signal received in each distance bin a filtering is performed so as to retain only the useful band of this spectrum. Conventionally this useful band corresponds to the frequency band for which the amplitude of the signal is greater than the maximum amplitude minus three decibels. A problem is that one or more spurious spectra may exist in this useful band.

Figure 3:
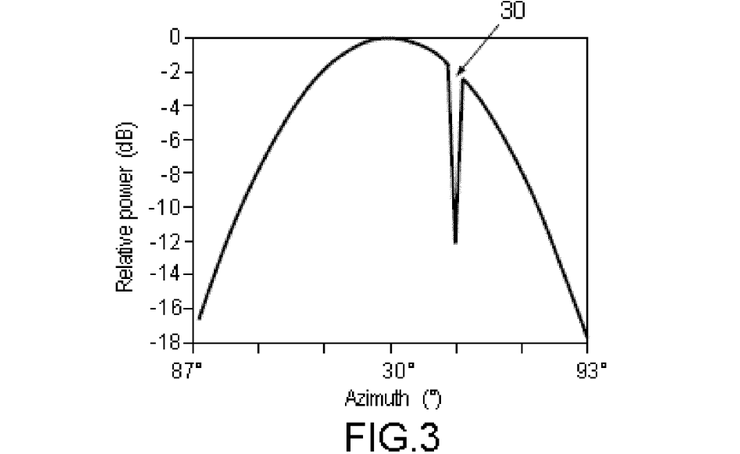
FIG. 3 is an exemplary graphical representation of the amplitude of a Doppler spectrum in the case where the backscattering is not uniform.

By way of example, FIG. 3 represents the amplitude of a Doppler spectrum in the case where the backscattering in the resolution cell (11) is not uniform but exhibits a lower value for a given azimuth. This attenuation (30) may, for example, be due to the presence of an oil slick, of hydrometeors or of speckle. In the case represented, the backscattering exhibits a point attenuation (30) of 10 dB of the reflectivity of the sea for an azimuth of 91°. This abscissa scale lying between 87° and 93° corresponds to a variation in Doppler frequency of −350 Hz to +350 Hz.

In the presence of hydrometeors and/or of breaking waves, when an airborne or space platform 10 performs an SAR imaging, several objects of different radial velocities Vr may be present in the radar resolution cell (11). The values of Vr are in general dispersed around a radial velocity $Vr_o$ (mean radial Velocity) with a certain width ΔVr.

In a schematic manner, the Doppler spectrum in the cell (11) consists of the sum of the spectrum of the assumed-fixed echoes, such as for example surface of the sea in the case of maritime imaging or the ground in a terrestrial case, and of the moving echoes due for example to rain and/or to the breaking of waves.

Figure 4A:
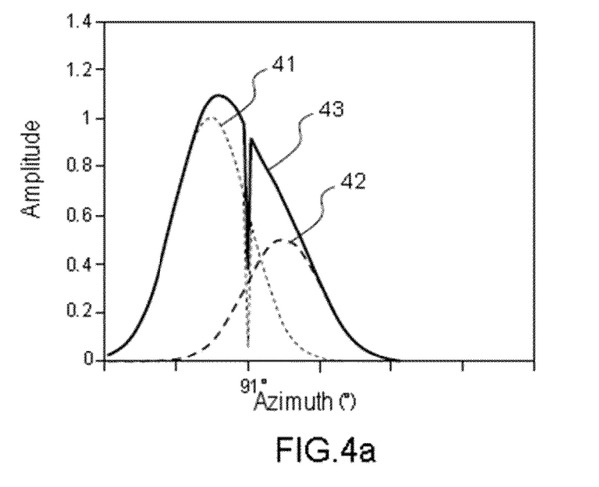
FIGS. 4a and 4b are examples of graphical representation of the amplitude of Doppler spectra affected by spurious glitches.

By way of illustration, FIG. 4a represents, according to a linear scale, the amplitude as a function of azimuth, of an exemplary spectrum of a sea exhibiting an oil slick 41, of an exemplary spectrum of rain echoes 42 as well as the spectrum resulting from the sum of the previous two spectra. It may be noted that the power of the rain echoes corresponds to a power of 3 dB below the power of the fixed echoes.

Figure 4B:
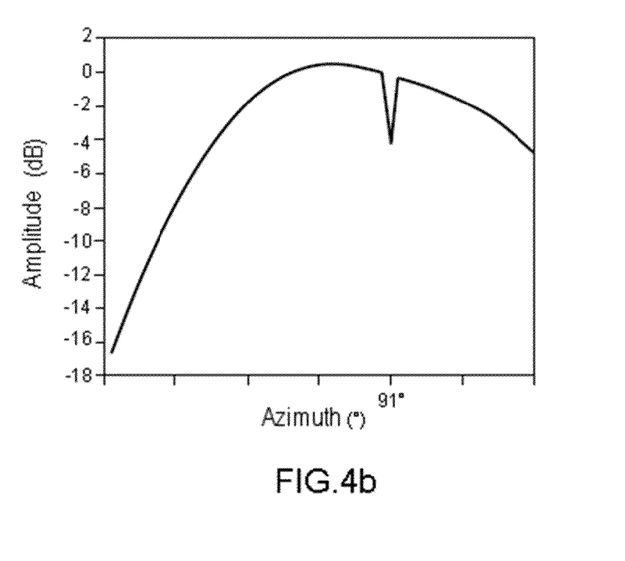

FIG. 4b represents the amplitude of the spectrum resulting from the sum of the rain echoes and of the echoes of sea exhibiting an oil slick, as a function of azimuth, with a logarithmic scale. With respect to the case of FIG. 3, it may be noted that for the attenuated part, the contrast between the attenuated spectral bin and the neighbouring spectral bins is now only 3 dB instead of 10 dB previously.

In order to reduce the contribution of the spurious spectrum, the invention consists in reducing the size of the useful band so as to retain only a minimum frequency band Δf of the spectrum in order to form the SAR image. This reduction in the frequency band can be regarded as a frequency filtering.

A consequence of this filtering is a reduction in the ground image zone on the transverse axis. In order to make up for this loss of information in the SAR image due to the filtering, the method according to the invention will consist in splitting up the time of illumination of the zone to be imaged and in forming several SAR sub-images or SAR imagettes 51 which will thereafter be juxtaposed to form the final SAR image.

Figure 5:
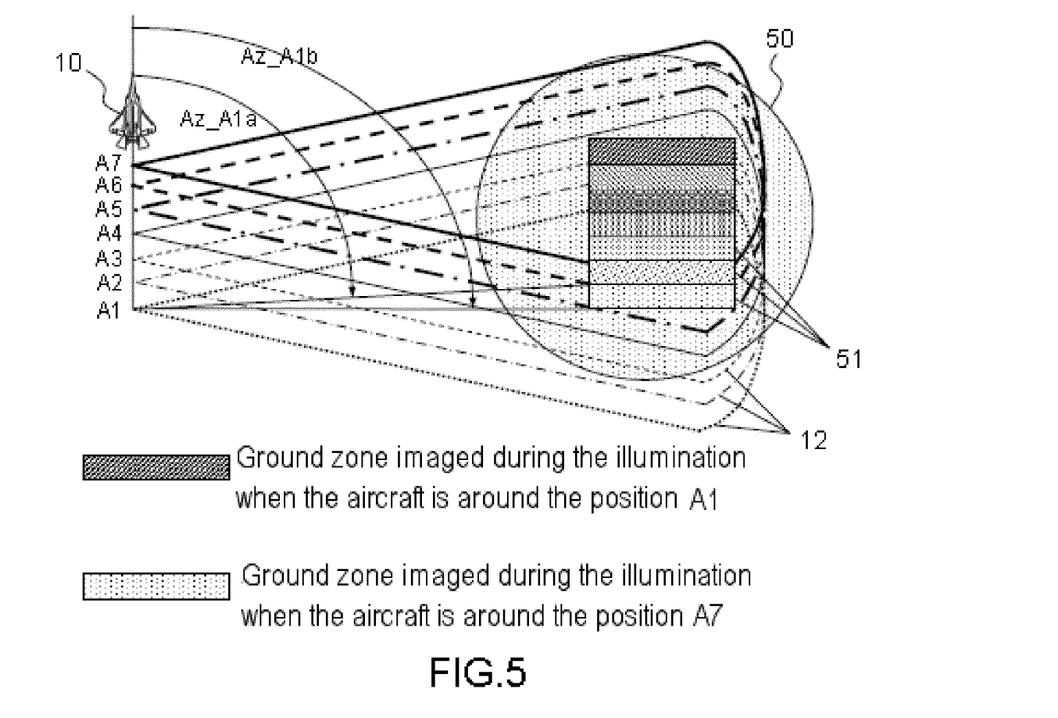
FIG. 5 illustrates the principle of the invention.

FIG. 5 illustrates the principle of splitting up of the illumination time and of the processing as sub-images.

This figure presents a schematic view of an exemplary platform 10 performing an SAR imaging of a zone of interest 50. It is assumed that the platform 10 moves at constant velocity and course so as to pass successively through positions A1 to A7. The antenna of the synthetic aperture radar is pointed at about 90° to the course followed by the platform 10. Doppler analyses are carried out on the basis of the reception of $N_{rec}$ radar pulses when the platform moves on a straight segment centred on the position A1 or A2, . . . , or A7 to form an SAR imagette 51.

Figure 6:
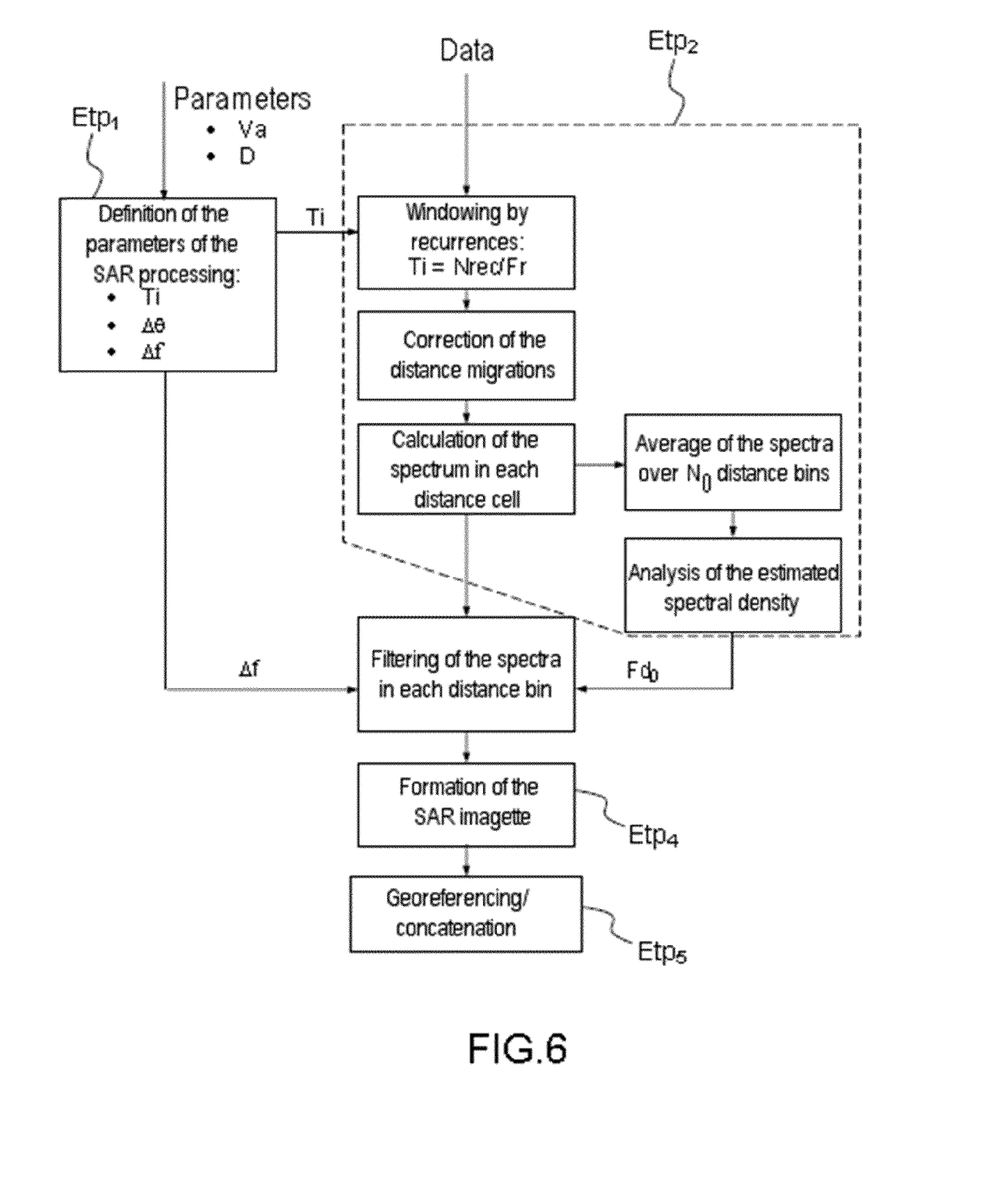
FIG. 6 represents a basic flowchart of the method according to the invention.

FIG. 6 represents a possible flowchart of steps of the method according to the invention. This method mainly comprises a step Etp1 of defining the SAR imaging parameters, a step Etp2 of calculating the spectrum of the signal received in each distance bin, a step Etp3 of filtering the spectra in each distance bin, a step Etp4 of SAR imagette 51 formation and a step Etp5 of concatenating the imagettes 51 to form the final SAR image.

It is assumed that the waveform emitted by the synthetic aperture radar has been chosen in such a way as to obtain the desired resolution on the radial axis and to limit the ambiguities in radial distance and in transverse distance.

On the basis of input parameters such as for example the velocity Va of the carrier, the distance D of the zone to be imaged with respect to the platform 10, the SAR processing parameters will be defined automatically.

The main input element for defining the SAR processing on the transverse axis is the resolution $δ_{rt}$ on this axis. According to the desired radar application, this resolution may be chosen more or less fine. The choice of this resolution leads to the value of the coherent integration time $T_i$ by using for example equation 5 cited previously.

During this time $T_i$, the platform 10 progressing at a velocity Va, moves a distance Lv equal to:

$$Lv = Va \cdot T_i \quad \text{(Equation 7)}$$

Figure 7:
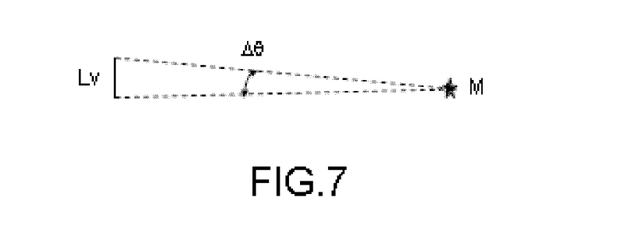
FIG. 7 illustrates the variation in azimuth of a point placed a certain distance from a platform when this platform is moving.

With reference to FIG. 7, if one considers a point M situated a distance D from the platform and at about 90° to the course of the platform, the azimuth of this point M in the middle of the interval of duration $T_i$ will vary by a value equal to:

$$\Delta\theta = \frac{Va \cdot Ti}{D} \quad \text{(Equation 8)}$$

Using equations 5, with a value of θ of about 90° we obtain:

$$\Delta\theta = \frac{\lambda}{2 * D * \delta\theta} \quad \text{(Equation 9)}$$
$$= \frac{\lambda}{2 \cdot \delta rt}$$

Thus, a portion Δf of the Doppler spectrum, centred around the central frequency $f_{D0}$, is sufficient to produce the image of the point M. This Doppler extent Δf can be obtained by differentiating equation (1 bis):

$$\Delta f = \frac{2 \cdot Va}{\lambda} \cdot \sin\theta \cdot \Delta\theta \quad \text{(Equation 10)}$$

Thus, for an angle θ of around 90° we obtain:

$$\Delta f = \frac{2 \cdot Va}{\lambda} \cdot \Delta\theta \quad \text{(Equation 11)}$$

Which, by using equations 5, with a value of θ of around 90°, and equation 9, leads to:

$$\Delta f = \frac{Va}{D * \delta\theta} \quad \text{(Equation 12)}$$
$$= \frac{Va}{\delta rt}$$

The values of the Doppler extent Δf and of the azimuthal width to be processed in the antenna lobe Δθ correspond to the minimum values making it possible to generate the image of a single point M on the transverse axis.

In the general technique of SAR imaging, it is preferable to produce, not the image of a single point M, but of the set of points extending transversely about the point M. This makes it possible to generate an image of a zone of transverse extent equal to the displacement of the carrier and thus to ensure image formation as the said carrier advances.

Moreover, if it is necessary to carry out azimuth-wise multi-view processing in such a way as to improve the radiometric resolution, the azimuthal widths Δθ and the spectral extents Δf associated therewith can be multiplied by a factor Nv corresponding to the number of views.

It should also be noted that the parameters of the equations defining the SAR parameters depend on the distance D between the radar and the target and that it is often necessary to divide up the zone to be imaged into several "swaths" distance-wise.

For the duration that the aeroplane is moving over a segment length such as defined previously, the processing carries out a spectral analysis in each distance bin corresponding to the swath. This analysis is carried out during a step Etp2, in a conventional manner by the procedures known to the person skilled in the art. In a known manner, a correction of the distance migrations is performed so as to take account of the fact that the distance traversed by the radar echoes evolves during the movement of the platform 10.

The measured spectral density is thereafter estimated by averaging the spectra over a predetermined number N of distance bins. There follows a signal processing operation intended to define whether the calculated spectral density is "normal" or polluted by spurious phenomena for example of meteorological origin. Accordingly, this operation takes into account the expected theoretical spectral density defined as a function of the characteristics of the antenna diagram and compares it with the measured spectral density.

The precise definition of the "normal" or "abnormal" character of this operation depends on the application and on the magnitude of the tolerated disturbances. It consists in defining whether the spectral density differs overly from that expected.

The processing thereafter estimates the central frequency $f_{D0}$ of the spectrum of the fixed echoes. Accordingly, the invention proposes an adaptive procedure according to whether the measured spectrum is considered to be polluted or not by spurious echoes.

If the spectral density is considered to be "normal", the value adopted for the central frequency $f_{D0}$ is obtained by shifting the expected spectral density on the abscissa axis (Doppler frequency axis), in such a way that the correlation between the measured and expected spectral densities is a maximum. The central frequency $f_{D0}$ corresponds to the frequency for which the expected theoretical spectral density is a maximum.

When the measured spectral density is considered to be polluted it is spread over a much wider frequency band than in the "unpolluted" case. This phenomenon stems from the fact that the spectrum of the useful echoes, such as for example those of the ground or of the sea, is separated frequentially from the spurious spectra because these spurious glitches have their own inherent velocity which implies that their Doppler frequency is more significant.

The location of the centre $f_{D0}$ of the useful spectrum of the fixed echoes backscattered by the zone of interest 50 will be performed by correlation with the theoretical spectrum's shape obtained on the basis of the characteristics of the radar antenna diagram. The procedure will consist in seeking the side where the slope is steepest on the curve of the measured spectrum. This side corresponds to the frequency band for which the density of the measured spectrum is hardly disturbed by the spurious effects. The expected theoretical spectral density is thereafter shifted on the abscissa axis (Doppler frequency axis), in such a way that the correlation between the expected and measured densities is a maximum on the side of the curve of measured spectrum having the steepest slope. The central frequency $f_{D0}$ is thereafter determined by seeking the frequency for which the trend of the theoretical spectrum is a maximum.

Figure 8A:
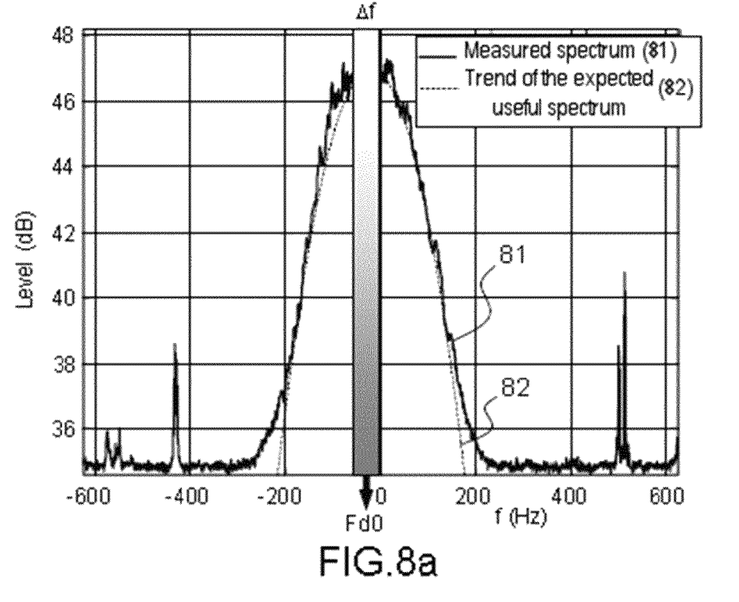
FIGS. 8a and 8b are respectively examples of graphical representation of the amplitude of a "normal" spectrum and of that of a "polluted" spectrum.
Figure 8B:
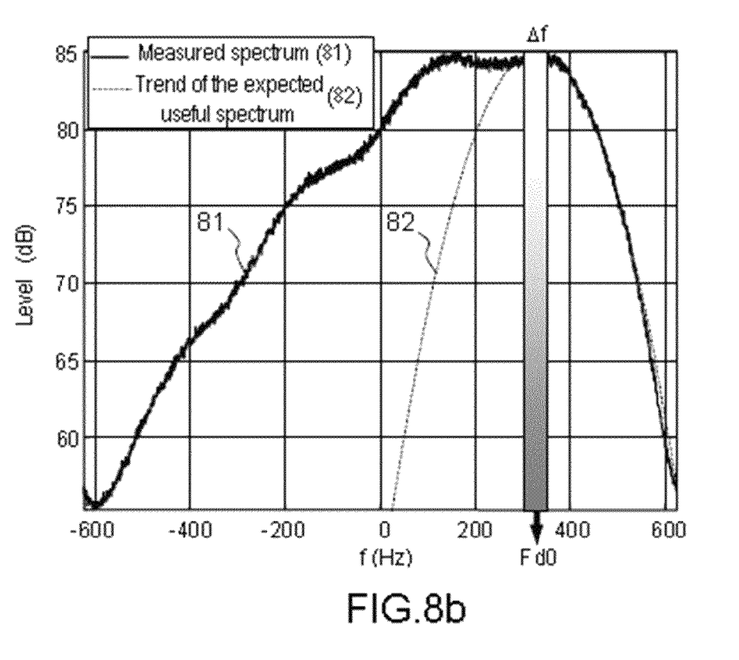

By way of illustration FIGS. 8a and 8b present examples of graphical representation of the amplitude of a "normal" spectrum and of that of a "polluted" spectrum.

FIG. 8a represents the superposition of the measured spectrum 81 and of the trend of the expected theoretical useful spectrum 82 in the case where the measured spectrum is not polluted by a spurious spectrum. In this case the two curves are similar. As seen previously the central frequency $f_{D0}$ corresponds to the frequency for which the trend of the theoretical spectrum is a maximum.

FIG. 8b corresponds to the case where the spectrum is polluted. The trend of the theoretical spectral density is placed in such a way as to bring into coincidence the side where the slope of the curve of the measured spectral density is steepest.

After choosing the central frequency $f_{D0}$ and the Doppler extent Δf, a filtering of these spectra is performed in each distance bin by a bandpass filter centred on $f_{D0}$ and of width Δf.

Thus, in contradistinction to the conventional SAR imaging procedure, instead of preserving a frequency band equal to the useful band at −3 dB, the method implemented by the invention retains a more restricted frequency band equal to the spectral extent Δf calculated previously.

For each sub-illumination, an SAR imagette 51 is produced according to techniques known to the person skilled in the art, by using the signal filtered during a step Etp4.

The processing comprises a geometric conformity operation making it possible to place each imagette 51 in a terrestrial mapping reference. The final SAR image is thereafter formed by concatenation by juxtaposing the various imagettes 51 formed.

Having regard to the constraints on the splitting up of the illumination times, there is no void between the various imagettes 51; the final SAR image can therefore be formed without information loss.

It may happen that there are zones of overlap between consecutive imagettes 51. In the case of overlap of imagettes 51, the problematic issue of multi-view imaging arises again. According to techniques known to the person skilled in the art, this problem can be solved for example, by averaging the values of the pixels of each point of the final SAR image that is overlapped by several imagettes 51.

In an advantageous manner, the travelling SAR imaging mode such as defined makes it possible to obtain a better contrast between ground zones of low and of high radar reflectivity.

The method according to the invention can be applied in the case of SAR modes of low or of medium resolution on the transverse axis which are typically used to identify zones on the ground or the sea of various radar reflectivities. In these cases, it is possible to use a coherent-integration time that is smaller than the time for which a point M of the ground to be imaged is present in the main lobe of the antenna as the radar carrier advances.

The invention claimed is:
1. A method of eliminating spurious echoes in Synthetic Aperture Radar (SAR) imaging, the method comprising:
   defining SAR imaging parameters,
   calculating spectrum of signal received, in each distance bin, of a zone of interest, locating a central frequency of fixed echoes backscattered by the zone of interest, the locating step further comprising:
  seeking a side where a slope is steepest on a curve of a measured spectrum,
  shifting a shape of a theoretical spectrum obtained based on characteristics of a radar antenna diagram on Doppler frequency axis to maximize a correlation between the theoretical and measured spectrum,
  seeking a frequency for which the theoretical spectrum is maximum,
filtering spectra in each distance bin carried out by a band-pass filter centered on the central frequency of fixed echoes backscattered by the zone of interest,
forming SAR sub images, and
concatenating the SAR sub images to form a final SAR image.

2. The method according to claim 1, wherein when pixels overlap during the concatenating step, the concatenating step further comprises averaging a value of pixels of each point of the final SAR image that is overlapped by several sub images.

* * * * *